United States Patent [19]

Few

[11] Patent Number: 5,226,998
[45] Date of Patent: Jul. 13, 1993

[54] PROCESS FOR MAKING A VEHICLE MOLDING

[75] Inventor: Sam K. Few, West Carrollton, Ohio

[73] Assignee: Plastic Trim, Inc., Dayton, Ohio

[21] Appl. No.: 801,706

[22] Filed: Dec. 2, 1991

[51] Int. Cl.$^5$ ............................................. B29C 47/04
[52] U.S. Cl. ........................... 156/244.11; 156/244.12; 156/244.19; 156/244.24; 156/244.25; 156/244.27; 264/177.17; 293/1; 293/128; 428/31
[58] Field of Search ............... 156/244.11, 244.12, 156/244.19, 244.24, 244.25, 244.27; 264/177.16, 177.17, 210.1; 293/1, 128; 428/31

[56] References Cited

U.S. PATENT DOCUMENTS

| | | | |
|---|---|---|---|
| 3,046,174 | 7/1962 | Brooks et al. | 156/244.25 |
| 3,359,030 | 12/1967 | Newman | 293/1 |
| 3,367,702 | 2/1968 | Sauer | 293/62 |
| 3,388,523 | 6/1968 | Evans | 57/717 |
| 3,451,709 | 6/1969 | Swauger | 293/1 |
| 3,458,386 | 7/1969 | Shanok et al. | 156/244.25 |
| 3,506,294 | 4/1970 | Newman | 293/1 |
| 3,572,799 | 3/1971 | Truesdell et al. | 293/1 |
| 3,582,134 | 6/1971 | Shaff | 296/146 |
| 3,752,521 | 8/1973 | Lafebre | 293/1 |
| 3,817,016 | 6/1974 | Barenyi | 52/717 |
| 3,843,475 | 10/1974 | Kent | 293/1 |
| 3,886,250 | 5/1975 | Danko | 264/177.17 |
| 3,940,901 | 3/1976 | Nivet | 52/717 |
| 3,959,538 | 5/1976 | Loew | 428/31 |
| 3,970,498 | 7/1976 | Loew | 156/211 |
| 4,081,504 | 3/1978 | Wenrick et al. | 264/174 |
| 4,174,986 | 11/1979 | Jennings | 156/160 |
| 4,220,365 | 9/1980 | Foster et al. | 293/128 |
| 4,260,655 | 4/1981 | Zoller | 428/31 |
| 4,463,539 | 8/1984 | Simon | 52/717 |
| 4,489,019 | 12/1984 | Takeda et al. | 264/26 |
| 4,600,461 | 7/1986 | Guy | 156/244.27 |
| 4,617,209 | 10/1986 | Ives | 428/31 |
| 4,619,847 | 10/1986 | Jackson | 428/31 |
| 4,707,008 | 11/1987 | Falco | 293/128 |
| 4,719,067 | 1/1988 | Thiel | 264/259 |
| 4,726,614 | 2/1988 | Myers et al. | 293/128 |
| 4,808,450 | 2/1989 | Guy | 428/31 |
| 4,828,303 | 5/1989 | Soria | 293/128 |
| 4,849,045 | 7/1989 | Schmidt | 156/244.24 |
| 4,869,937 | 9/1989 | Nagata et al. | 428/31 |
| 4,871,205 | 10/1989 | Bray | 293/128 |
| 4,969,674 | 11/1990 | Wagner | 293/128 |
| 5,023,033 | 6/1991 | Cakmakci | 293/1 |
| 5,063,014 | 11/1991 | Cakmakci | 428/31 |
| 5,108,681 | 4/1992 | Cakmakci | 428/31 |
| 5,114,650 | 5/1992 | Franck et al. | 264/177.17 |
| 5,139,830 | 8/1992 | Gross | 293/128 |

Primary Examiner—Caleb Weston
Attorney, Agent, or Firm—Killworth, Gottman, Hagan & Schaeff

[57] ABSTRACT

A process for forming a vehicle molding is provided. The process includes the steps of extruding a continuous strip of a thermoplastic material, and securing a continuous decorative laminate onto the upper surface of the strip to form a continuous substrate. Thereafter, the substrate is transversed through a laminating roll having an outer surface contour conforming to a predetermined shape such that the substrate is formed into that shape after it has exited the laminating roll. The substrate is passed through a cooling bath to increase the rigidity thereof and then, severed at the ends of each shape formed in the substrate to form individual vehicle moldings. The process may include other operation steps such grinding, coating and securing an adhesive tape thereto all of which facilitate adherence to the vehicle surface.

20 Claims, 4 Drawing Sheets

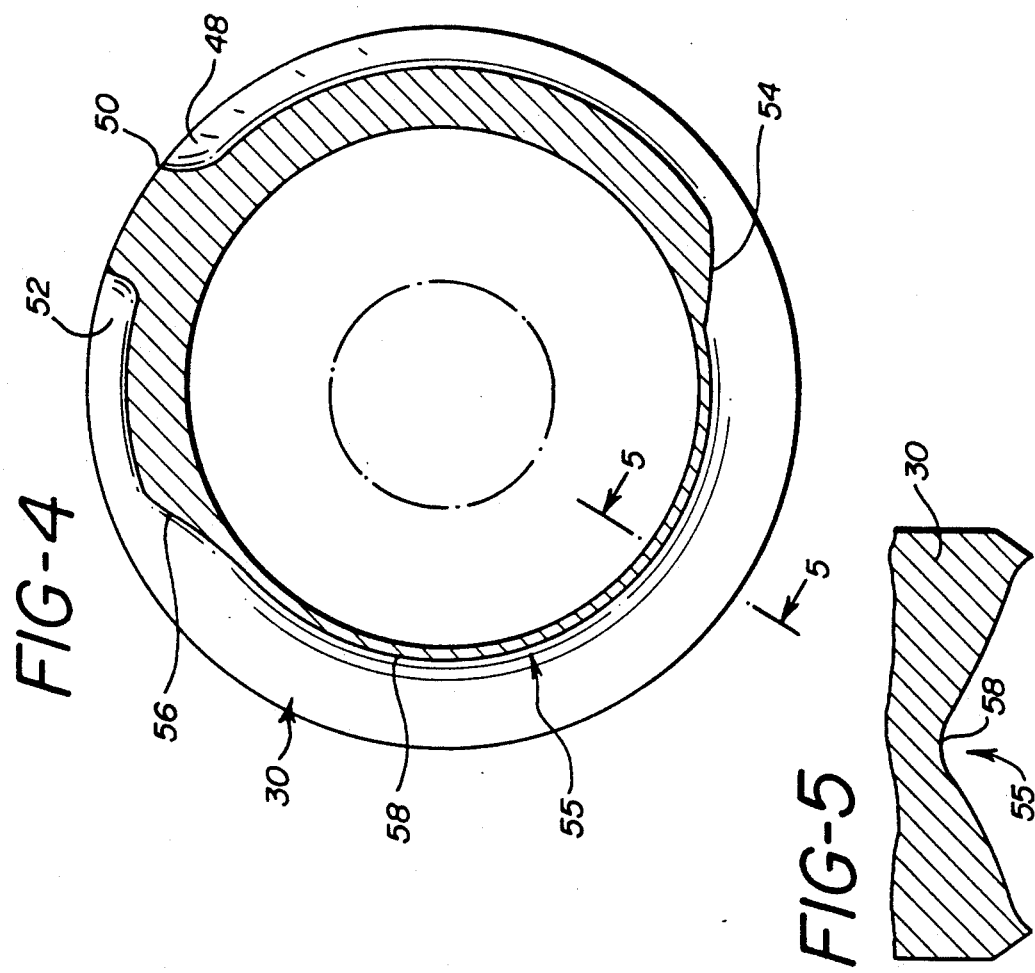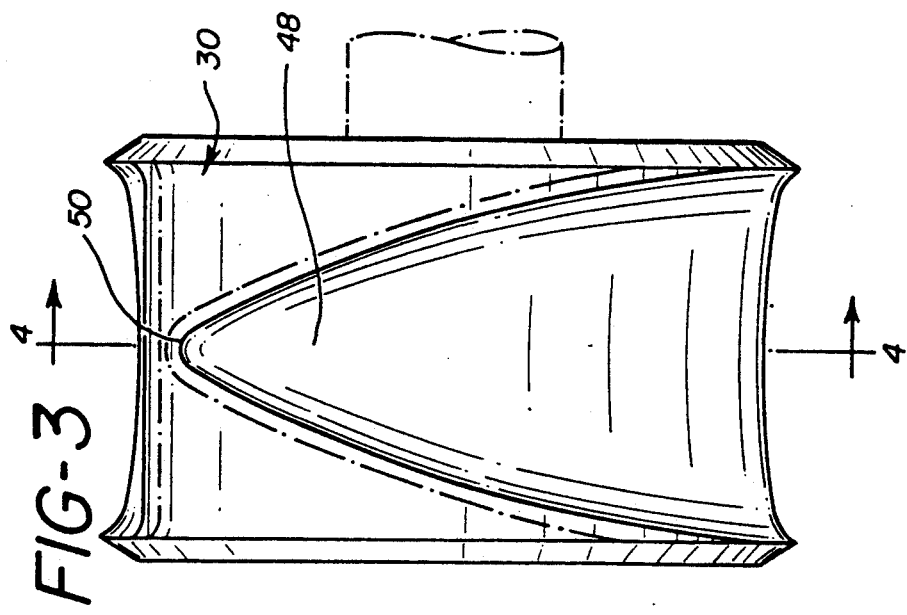

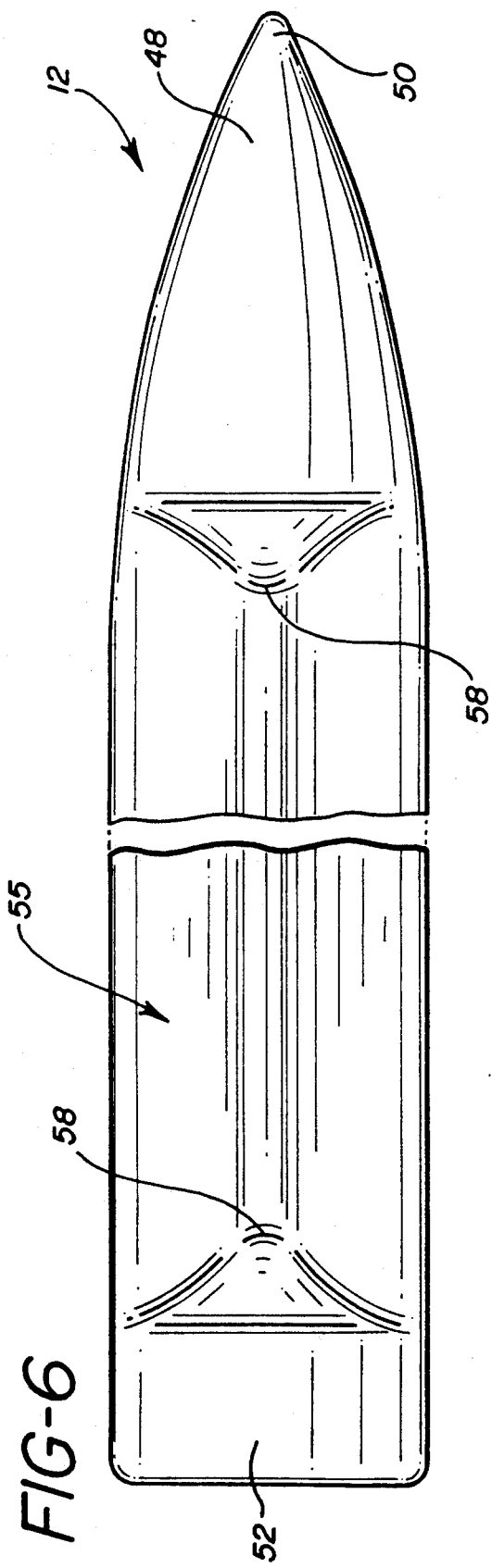

PROCESS FOR MAKING A VEHICLE MOLDING

BACKGROUND OF THE INVENTION

The present invention generally relates to a vehicle molding or trim strip for a vehicle and more particularly, to a process for forming a vehicle molding having an improved cosmetic appearance in the end portions.

Decorative vehicle moldings or trim strips are widely used to enhance the appearance of vehicles such as cars, trucks, vans and the like. Typically, such vehicle moldings are manufactured by a process which includes extrusion of a thermoplastic strip from a single unitary plastic material or multiple plies of different types or colors of plastic materials. Decorative plastic or metallic film may also be applied to the viewing surface of such vehicle moldings. As will be appreciated by those skilled in the art, the extruded plastic material, when cut to a desired length, will have the cut end exposed throughout the cross-section of the molding. In the extrusion operation, it is possible to obtain any one of a wide variety of surface appearances of the vehicle molding as extruded ranging from dull, to matted, to textured or to glossy, depending upon the type of extrusion die and operating conditions. This is well known in the art and does not form a part of the present invention.

However, the surface appearance, as extruded, will usually be different from the surface appearance of an end cut through the cross-section of the molding. The difference in appearance between a surface, as extruded, and a surface of a cut end is magnified in those instances in which a foam plastic strip is extruded since the cellular structure of the foam will be visible on the cut end while the surface as extruded may have a non-cellular or solid structure. Thus, for aesthetic purposes it is not desirable to have an end, which is cut through the cross-section of the extruded length of plastic, exposed to view and much effort has been devoted to providing an end finish to such vehicle moldings which is aesthetically pleasing in appearance. Frequently, it is desired to have the moldings terminate in tapered or pointed ends. However, whether such ends are tapered, pointed or some other configuration, it is indisputably desirable to ensure that no portion of the interior cross-section of the vehicle molding be exposed and that only the decorative surface be exposed when the molding is attached to a vehicle.

Additionally, in many instances the surface appearance of the side of the extruded molding intended to face the vehicle is different from that of the surface intended for viewing. This is particularly true in those moldings having multiple layers with the decorative layer intended for viewing having a different color than the base layer forming the side intended to face the vehicle. In those types of moldings, it is commercially unacceptable for base layers to be visible when the molding is affixed to a vehicle. Finished moldings may be attached to a vehicle by any one of a number of means well-known to those skilled in the art. One such attachment means is a double-faced adhesive foam core strip, one side of which is attached to the vehicle and the other side of which contacts the surface of the molding facing the vehicle (i.e., the surface opposite the decorative viewing surface).

There have been many attempts in the past to provide decorative moldings which have aesthetically pleasing end portions. None of these attempts, however, have materialized into a process in which both the aesthetics as well as the manufacturing costs are advantageous. For example, Cakmakci, U.S. Pat. No. 5,023,033, discloses a method by which a previously extruded length of thermoplastic material intended for viewing is maintained at a cold temperature, well below the softening temperature of the thermoplastic material, during the reshaping operation. A heated mold is moved against surface facing the vehicle of the end portion to be reshaped. Thereafter, the end portion is squeezed between the cold contoured mold face and the heated mold after which it is cooled to set the end portion in conformity with the contoured mold face.

Takeda et al, U.S. Pat. No. 4,489,019, discloses forming a longitudinal molding with non-uniform sections. The process disclosed in Takeda et al begins with an extrusion molded thermoplastic strip which is reshaped to provide a remolded end portion. The extruded thermoplastic strip is placed into a mold, heated and partially fused by high frequency dielectric heating and then, cooled in the mold so that the material is partially remolded. Preferably, the total volume of the whole material placed in the mold is equal to the volume of the cavity of the mold. The heated portions of the longitudinal strips are melted and flow along the surface of the cavity of each of the molds. Takeda et al also disclose reforming the strip around a separately molded clip which may be utilized to connect the part to the vehicle.

Loew, U.S. Pat. No. 3,959,538, discloses contoured end structures for trim strips formed from a length of extruded plastic material. The end structures have various configurations and are produced by removing a portion of the trim strip material as extruded between the side portions thereof to define a pair of V-shaped notches or recesses and then deforming the remaining portions of the trim strip adjacent the recess to close the recess and bring laterally opposite edges thereof into juxtapositional relationship. The juxtaposed edges are then bonded by heat sealing to complete the forming operation.

The method disclosed in Jennings, U.S. Pat. No. 4,174,986, also begins with a length of extruded thermoplastic material such as polyvinylchloride (PVC) which is cut into segments of desired lengths. In accordance with Jennings, an improved method for forming tapered ends is disclosed with the stated purpose of avoiding the tendency of the finished strip to delaminate from the substrate to which it is attached. Jennings discloses a V-shaped wedge cut from an end of the strip, thereby creating two similar triangular legs which are drawn together and adhered to create the pointed taper. The legs at the notched ends are bent upwardly at approximately 45° to counteract the tendency of the end to arch after the taper is formed.

The inventions disclosed in Ives, U.S. Pat. No. 4,617,209, Jackson, U.S. Pat. No. 4,619,847, and Thiel, U.S. Pat. No. 4,719,067 utilize separately molded end caps which are separately adhered or otherwise affixed to the trim strip to provide for the decorative end portion of the finished article. With the exception of Takeda and Cakmakci the above-identified attempts in the art involve costly operations of either cutting and adhering or, separately molding an end cap and adhering or otherwise connecting it to the extruded strip. Additionally, strips formed according to those inventions suffer from an aesthetic standpoint in that the parting line between the connected members is visible on the viewing surface of the finished part unless an additional decorative layer of film is applied thereover which adds to the manufacturing costs.

Similarly, there is no indication in Takeda and Cakmakci that any effort is made to deal specifically with finishing the end portions as proposed in the present invention. Although parts produced according to the invention disclosed in Takeda may not have a parting line on the viewing surface, the method utilized therein results in remelting the entire mass of the strip portion intended to be remolded so that all portions are melted and flow along the surface of the cavity of each of the molds. Such remelting and flowing of the melted surface results in the surface having an appearance different from that of the surface as extruded. Similarly, the method disclosed in Cakmakci requires a subsequent reshaping operation which significantly adds to manufacturing costs and time.

Accordingly, there is a need in the art for a process for forming a molding having an improved cosmetic appearance, especially in the end portions. There is also a need for such a process for forming a vehicle molding which has the combined advantage of improved aesthetics as well as reduced manufacturing costs.

SUMMARY OF THE INVENTION

The present invention satisfies the aforementioned needs by providing a process for forming a vehicle molding having an improved cosmetic appearance and which has the combined advantage of improved aesthetics as well as reduced manufacturing costs. The process provides an effective way to produce a single-piece vehicle molding via an "in-line" process which thereby eliminates the need for a separate step to make the end pieces of a vehicle molding. This feature is largely attributed to the step of laminating the decorative laminate and the thermoplastic substrate together with a laminating roll having an outer surface contour engraved or molded therein which conforms to the desired configuration for the entire vehicle molding.

In accordance with one aspect of the invention, a process for forming a vehicle molding comprises the steps of extruding a continuous strip of a thermoplastic material, and securing a continuous decorative laminate onto the upper surface of the strip to form a continuous substrate. The process further comprises the step of transversing the substrate under a laminating roll having an outer surface contour conforming to a predetermined vehicle molding shape such that the substrate is formed into a continuous series of the shapes after the substrate exits the laminating roll. Finally, the continuous substrate is cooled to increase the rigidity thereof and severed at predetermined ends to form the vehicle molding.

The process may include the step of grinding the undersurface of the substrate to facilitate bonding of the vehicle molding to a surface of the vehicle. Additionally, the process may include the step of coating the undersurface of the substrate with an adhesive material to form a protective coating which prevents plasticizers or the like contained in the thermoplastic material from inhibiting bonding to the vehicle surface. Thereafter, a double-faced adhesive tape may be mounted on the protective coating for bonding the molding to a surface of the vehicle. The undersurface of the substrate is defined herein as the surface which faces the surface of the vehicle, whereas the upper surface or the "viewing" surface of the vehicle molding is defined herein as the surface visible to an observer when the vehicle molding is mounted on the vehicle. The decorative laminate will form the viewing surface of the vehicle molding.

The process may produce a single-piece vehicle molding having two ends of which one end is tapered into a point while the opposite end has a squared shape. The ends are separated by an elongated raised portion which is elevated to a peak to provide a decorative vehicle molding. The vehicle molding produced according to the invention may be for purposes of decoration as well as protection. In addition, the vehicle molding may be formed of a thermoplastic material such as polyvinyl chloride and have a polyethylene teraphthalate decorative layer mounted thereon.

Accordingly, it is an object of the invention to provide a process for forming a vehicle molding having an improved cosmetic appearance, especially in the end portions; it is also an object of the invention to provide such a process for forming a vehicle molding which has the combined advantage of improved aesthetics as well as reduced manufacturing costs. Other objects and advantages of the invention will be apparent from the following detailed description, the accompanying drawings and the appended claims.

BRIEF DESCRIPTION OF THE DRAWINGS

FIG. 3 is a front-end view of a lamination roll in accordance with the invention;

FIG. 4 is a cross-sectional view of the lamination roll taken along view line 4—4;

FIG. 5 is a partial cross-sectional view of the lamination roll taken along view line 5—5 illustrating an outer surface contour for producing a vehicle molding according to the present invention;

FIG. 6 is a plan view of a vehicle molding having the contour shown in FIG. 5;

FIG. 7 is a side view of the vehicle molding illustrated in FIG. 6;

FIG. 8 is a cross-sectional view of the vehicle molding shown in FIG. 7 taken along view line 8—8; and FIG. 9 is a cross-sectional view of the vehicle molding shown in FIG. 7 taken along view line 9—9.

DETAILED DESCRIPTION OF THE PREFERRED EMBODIMENTS

Figure 1:
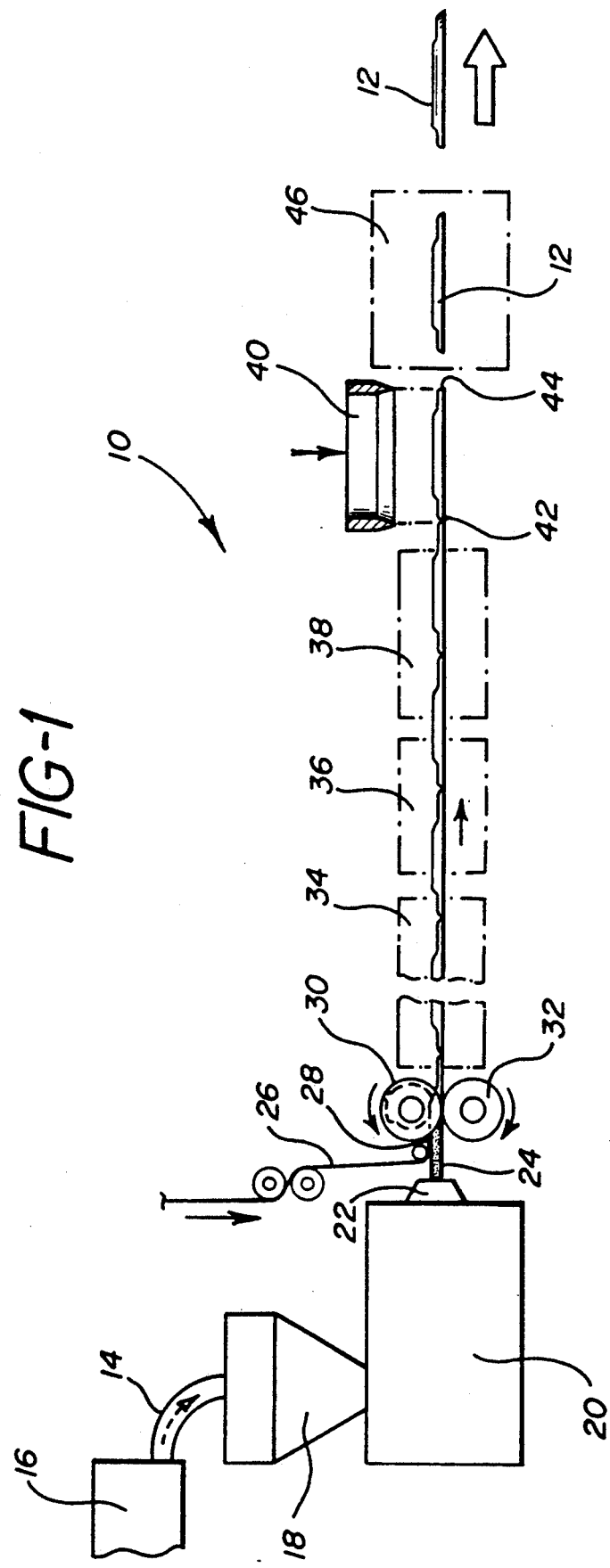
FIG. 1 is a schematic view of the process in accordance with the invention.

The present invention is directed to a process, generally referred to by reference numeral 10, for forming a vehicle molding illustrated schematically in FIG. 1. The process 10 generally produces a vehicle molding 12 from a thermoplastic material 14 which is readily deformable. The thermoplastic material 14, typically stored and dispensed from a container 16, is fed into a hopper 18 mounted on an extruder 20 as clearly seen in FIG. 1. The extruder 20 preferably has an operating temperature well above that of the melting or softening temperature of the thermoplastic material 14. As a result, the thermoplastic material 14 is ultimately converted into its molten phase. By means of devices well known in the art, the extruder 20 extrudes the molten thermoplastic material 14 through an extruder die 22 having a preselected design based upon the desired shape of the vehicle molding 12. Of course, the extruder die 22 may replaced as often as necessary to produce vehicle moldings for other types of vehicles which may require different extruder die designs. For example, the extruder die 22 may be designed to extrude a vehicle molding 12 for an automobile or it may be replaced with another extruder die especially fit for producing a vehicle molding suitable for a truck or the like without departing from the scope of the invention.

In any event, the extruder die 22 extrudes a continuous strip 24 of the thermoplastic material 14 onto which a continuous decorative laminate 26 is mounted. It should be understood that the decorative laminate 26 is mounted on the upper surface of the strip 26. The decorative laminate 26 forms the upper surface of which the molding 12, the upper surface being the "viewing" surface in that it is the surface of the vehicle molding 12 ultimately seen when mounted on a vehicle. By virtue of having the thermoplastic material 14 in the molten phase when the decorative laminate 26 is mounted thereon, the decorative laminate 26 and the thermoplastic material 14 are naturally bonded together. The strip 24 having the decorative laminate 26 mounted thereto collectively form a substrate 28 which is transversed through a laminating roll 30. Preferably, the laminating roll 30 will have a flat roll 32 having a smooth outer surface which rotates in the opposite direction to that of the laminating roll 30 to provide a flat surface against which the laminating roll 30 may form the substrate 28. Those skilled in the art will appreciate that other rotating devices or stationary devices may be substituted for the flat roll 32 without departing from the invention. With respect to the laminating roll 30, it preferably has an outer surface contour conforming to the desired shape of the vehicle molding 12. Thus, the laminating roll 30 can be designed to form a vehicle molding 12 having virtually any structural design suitable for mounting on a surface of a vehicle.

After the substrate 28 exits the laminating roll 30 and the flat roll 32, it includes a continuous series of the desired shape for the vehicle molding 12. The thermoplastic material 14 in the substrate 28, however, is still in the molten phase. Thus, the substrate 28 must be cooled to increase the rigidity of the substrate 28. As those skilled in the art will appreciate, there are a multitude of methods for cooling the substrate 28 some of which include forced-air cooling, liquid-cooling, and ambient air cooling. Preferably, the substrate 28 is passed through an elongated water cooling bath 34, the length of which is preferably sufficient to permit the substrate 28 to harden or become rigid. The length, of course, will depend upon various process parameters such as the specific thermoplastic material used, the speed of the substrate as it passes through the cooling bath 34 and the relative temperature of the water in the cooling bath 34.

After the substrate 28 has passed through the cooling bath 34, it may be processed further depending upon the requirements for the vehicle molding 12. For example, a grinding operation 36 may be used to smooth the undersurface of the substrate 28 in order to facilitate bonding of the vehicle molding 12 to a surface of a vehicle. In addition, the substrate 28 may pass through a coating operation 38 for forming a protective coating on the undersurface of the substrate 28 to prevent any plasticizers or the like contained in the thermoplastic material 14 from migrating to the surface of the vehicle molding 12. In this way, the plasticizers will not inhibit the bond ultimately formed between the vehicle molding 12 and the vehicle. The protective coating may comprise an adhesive coating. Also within the coating operation 38, a double-faced adhesive tape can be applied to the undersurface of the substrate 28 for bonding the vehicle molding 12 to the surface of the vehicle. Those skilled in the art will appreciate that a wide variety of double-faced adhesive tapes may be used in accordance with the invention. The preferred double-faced adhesive tape, however, will be acrylic-based.

Preferably, the process 12 includes a severing operation 40 in which the substrate 28 is severed at predetermined ends 42 and 44, the locations of which will depend upon the desired configuration of the vehicle molding 12. The severing operation 40 may be performed by any variety of devices known in the art for severing materials used to produce vehicle moldings. Such devices include conventional automated and manual slicing or cutting devices which may be used to sever the ends 42 and 44. After the severing operation 40, the substrate 28 is substantially converted into the vehicle molding 12. Thereafter, the vehicle molding 12 undergoes a finishing operation 46 in which the vehicle molding 12 is prepared for shipping. The finishing operation 46 may be performed immediately or at a later time "off-line" from the present process.

Figure 2:
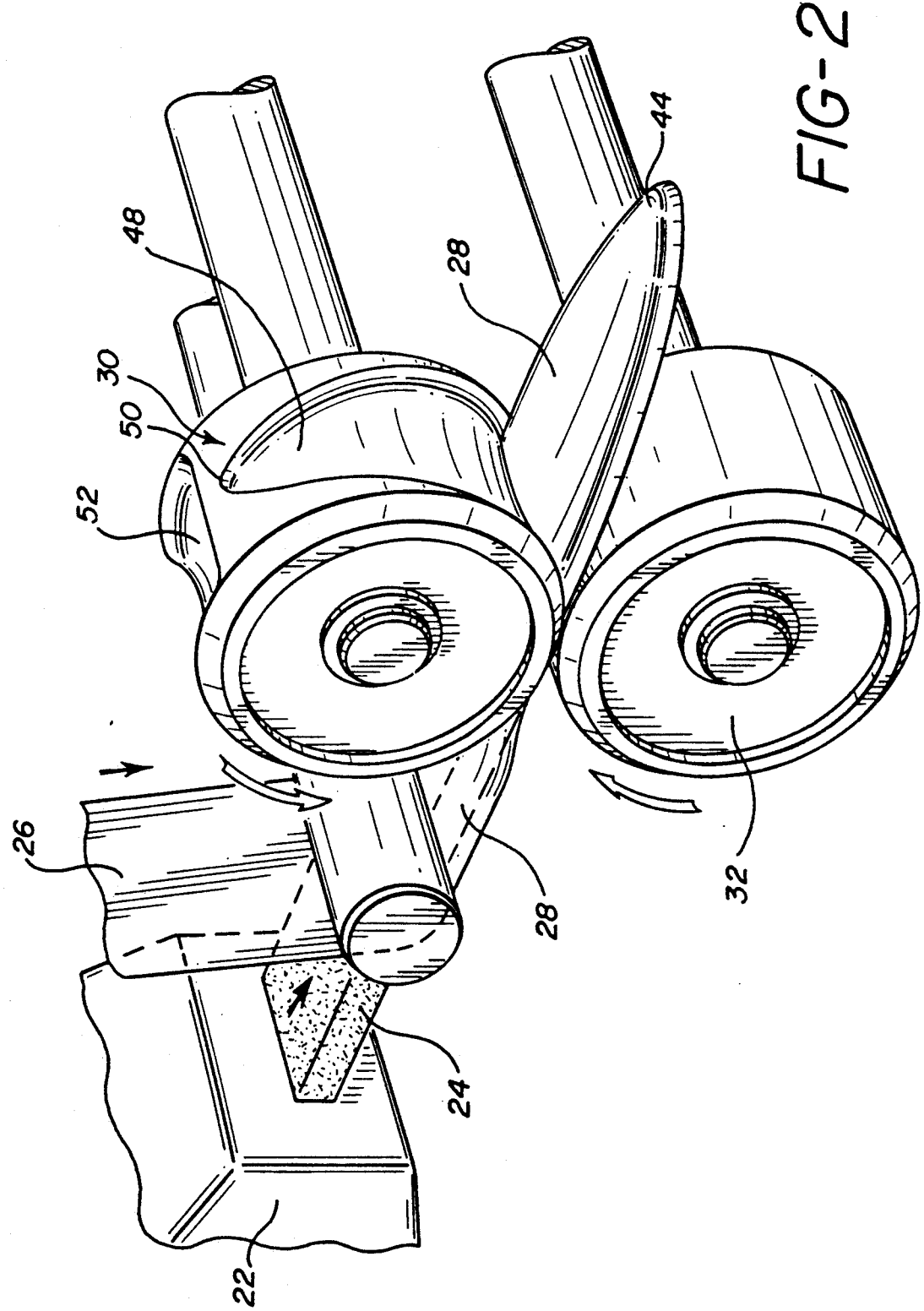
FIG. 2 is an enlarged view of the lamination step in the process of the invention.

Referring now to FIG. 2, an enlarged view of the laminating roll 30 and the flat roll 32 is illustrated to provide a more intuitive understanding of the invention. The extruder die 22 extrudes the thermoplastic material 14 in its molten phase into the strip 24 after which the decorative laminate 26 is secured onto the strip 24. As seen in FIG. 2, the laminating roll 30 has an outer surface contour conforming to a predetermined shape for the vehicle molding 12. Stated differently, the laminating roll 30 has the desired shape molded or engraved into the outer or "rolling" surface of the laminating roll 30. The substrate 28 exits the laminating roll 30 substantially in the desired shape. By way of example, the laminating roll 30 may have an outer surface contour including an end portion 48 tapered to a point 50 and the opposite end portion 52 having a squared shape. As a result of using the laminating roll 30 in the lamination step of the process 10, the substrate 28 will have a shape conforming substantially to the outer surface contour of the laminating roll 30. As those skilled in the art will appreciate, any desired outer surface contour may be substituted to produce a wide variety of vehicle moldings.

FIG. 3 illustrates the laminating roll 30 depicted in FIG. 2. FIG. 3 is an end view of the laminating roll 30 which shows more clearly the contour of the outer surface which ultimately form the shape of the vehicle molding 12. The end portion 48 is tapered to a point 50 so that when the vehicle molding 12 is bonded to the surface of a vehicle, the cross-section of the vehicle molding 12 is not "visible" to an observer. In this way, the aesthetics of the vehicle molding 12 is improved in addition to preventing contaminants and the like from penetrating into the vehicle molding 12, thereby possibly delaminating the vehicle molding 12 itself or separating the vehicle molding 12 from the surface of the vehicle.

Referring now to FIG. 4, a cross-sectional view of the laminating roll 30 taken along view line 4—4 is illustrated. As clearly shown in FIG. 4, the outer surface contour of the laminating roll 30 may vary in thickness to produce the desired vehicle molding 12. The laminating roll 30 includes the end portion 48 which is tapered to the point 50 and the end portion 52 having a squared shape. The vehicle molding 12 has an elongated portion 55 which is gradually elevated to a peak 58 formed by elevations 54 and 56, respectively. This configuration of the vehicle molding 12 is more clearly understood by referring to FIG. 5 in addition to FIG. 4. FIG. 5 is a cross-sectional view taken along view line 5—5 in FIG. 4 to illustrate the outer surface contour of the laminating roll 30 in the elongated portion 55 which is gradually elevated to a peak 58. As seen in FIG. 5, the elongated portion 55 of the outer surface contour includes a peak 58 to which the contour elevates. Those skilled in the art will appreciate that this particular outer surface contour is by way of example only and other outer surface contours may be molded or engraved into the laminating roll 30 to produce other vehicle moldings without departing from the scope of the invention.

FIGS. 6 and 7 illustrate the finished vehicle molding 12 produced by the process 10 of the invention. FIG. 6 is a plan view of the vehicle molding 12 which shows the point 50 in the end portion 48 and the end portion 52. The peak 58 in the outer surface contour of the laminating roll 30 is shown in the elongated portion 55 of the vehicle molding 12. FIG. 7 is a side view of the vehicle molding 12 illustrated in FIG. 6 in which the elevations 54 and 56, respectively, are clearly shown on the vehicle molding 12. It should be understood that the configuration of the vehicle molding 12 depicted in FIGS. 6 and 7 is substantially formed in the laminating step of the process 10 in which the laminating roll 30 includes the aforedescribed outer surface contour engraved or molded therein. Furthermore, those skilled in the art will appreciate that the vehicle molding 12 produced in accordance with the invention may be made for purposes of decoration or aesthetics as well as for protective purposes. For example, the vehicle molding 12 may be configured to serve as a door guard. Additionally, it should be understood that decorations and the like other than those described and illustrated herein may be incorporated into the vehicle molding 12 without departing from the scope of the invention.

Referring now to FIG. 8, a cross-sectional view taken along view line 8—8 in FIG. 7 is shown. FIG. 8 clearly illustrates that the end portion 52 has tapered sides 60 and 62, respectively, such that the cross-section of the vehicle molding 12 is not visible to an observer. Similarly, FIG. 9 illustrates a cross-sectional view of the vehicle molding taken along view line 9—9 in FIG. 7. As seen in FIG. 9, the tapered sides 60 and 62 extend along the elongated portion 55 and through the entire length of the vehicle molding 12.

Having described the invention in detail and by reference to preferred embodiments thereof, it will be apparent that modifications and variations are possible without departing from the scope of the invention which is defined in the appended claims. For example, the laminating roll 30 may have an outer surface contour different from that of which is described herein.

What is claimed is:

1. A process for forming a vehicle molding comprising the steps of:
    (a) extruding a continuous strip of a thermoplastic material;
    (b) securing a continuous decorative laminate onto the upper surface of said strip to form a continuous substrate;
    (c) transversing said substrate under a laminating roll having an outer surface contour conforming to a predetermined shape having first and second ends such that said substrate is formed into a continuous series of said shapes after said substrate has passed under said laminating roll;
    (d) cooling said substrate to increase the rigidity thereof; and
    (e) severing said substrate at said first and second ends of each said shape.

2. The process as recited in claim 1 wherein said step of transversing further includes a flat roll for providing a surface against which said laminating roll may form said substrate into said shape, said flat roll being positioned opposite said laminating roll such that said substrate may pass between said laminating roll and said flat roll.

3. The process as recited in claim 1 further comprises the step of grinding the undersurface of said substrate to facilitate bonding of said vehicle molding to a surface of said vehicle.

4. The process as recited in claim 3 further comprising the step of coating the undersurface of said substrate with an adhesive material to form a protective coating.

5. The process as recited in claim 4 further comprising the step of mounting a double-faced adhesive tape onto said protective coating for securing said vehicle molding to said vehicle.

6. The process as recited in claim 1 wherein said step of cooling comprises the step of passing said substrate through a water cooling bath.

7. The process as recited in claim 1 wherein said outer surface contour substantially comprises an elongated portion having first and second ends, wherein said first end substantially terminates at a point and said second end has substantially a squared shape.

8. The process as recited in claim 7 wherein said first end of said elongated portion is tapered.

9. The process as recited in claim 1 further comprising the step of extruding a continuous pigmented layer of thermoplastic material onto said strip prior to said securing step.

10. The process as recited in claim 1 wherein said decorative laminate comprises a support layer and a transparent thermoplastic layer having a metallic coating thereon.

11. The process as recited in claim 1 wherein said thermoplastic material comprises polyvinyl chloride.

12. A process for forming a vehicle molding comprising the steps of:
    (a) extruding a strip of a molten thermoplastic material;
    (b) feeding a decorative laminate onto the upper surface of said strip to form a substrate;
    (c) transversing said substrate under a laminating roll having an outer surface contour including a predetermined end shape such that said substrate includes an end conforming to said end shape after said substrate passes under said laminating roll; and
    (d) cooling said substrate to increase the rigidity thereof.

13. The process as recited in claim 12 further comprises the step of grinding the undersurface of said substrate to facilitate bonding of said vehicle molding to a surface of said vehicle.

14. The process as recited in claim 13 further comprising the step of coating the undersurface of said substrate with an adhesive material to form a protective coating.

15. The process as recited in claim 14 further comprising the step of mounting a double-faced adhesive tape onto the undersurface of said substrate for securing said vehicle molding to a surface of said vehicle.

16. The process as recited in claim 12 wherein said step of cooling comprises the step of passing said substrate through a water cooling bath.

17. The process as recited in claim 12 wherein said thermoplastic material comprises polyvinyl chloride.

18. A process for forming a vehicle molding comprising the steps of:
   (a) extruding a continuous strip of polyvinyl chloride;
   (b) securing a continuous decorative laminate onto the upper surface of said strip to form a continuous substrate;
   (c) transversing said substrate through a laminating roll having an outer surface contour conforming to a predetermined shape having first and second ends such that said substrate is formed into a continuous series of said shapes after said substrate exits said laminating roll;
   (d) cooling said substrate in a water cooling bath to increase the rigidity thereof; and
   (e) severing said substrate at said first and second ends of each said shape.

19. The process as recited in claim 18 wherein said step of transversing further includes a flat roll for providing a surface against which said laminating roll may form said substrate into said shape, said flat roll being positioned opposite said laminating roll such that said substrate may pass between said laminating roll and said flat roll.

20. The process as recited in claim 18 wherein said predetermined shape comprises an elongated portion gradually elevated to a peak, wherein said first end is substantially tapered to a point and said second end has a substantially squared shape.

* * * * *